United States Patent
Zhodzishsky et al.

(10) Patent No.: US 6,861,979 B1
(45) Date of Patent: Mar. 1, 2005

(54) METHOD AND APPARATUS FOR DETECTING ANOMALOUS MEASUREMENTS IN A SATELLITE NAVIGATION RECEIVER

(75) Inventors: Mark I. Zhodzishsky, Moscow (RU); Victor A. Veitsel, Moscow (RU); Andrey V. Narizhny, Moscow (RU)

(73) Assignee: Topcon GPS, LLC, Paramus, NJ (US)

( * ) Notice: Subject to any disclaimer, the term of this patent is extended or adjusted under 35 U.S.C. 154(b) by 0 days.

(21) Appl. No.: 10/798,536

(22) Filed: Mar. 11, 2004

Related U.S. Application Data

(60) Provisional application No. 60/536,872, filed on Jan. 16, 2004.

(51) Int. Cl.$^7$ .............................................. H04B 7/185
(52) U.S. Cl. ................................. 342/357.03; 701/215
(58) Field of Search ...................... 342/357.02, 357.03, 342/357.06, 357.12; 701/213, 214, 215

(56) References Cited

U.S. PATENT DOCUMENTS

| | | | |
|---|---|---|---|
| 5,502,641 A | | 3/1996 | Isomura |
| 5,831,575 A | * | 11/1998 | Gu .......................... 342/357.02 |
| 6,166,683 A | * | 12/2000 | Hwang ................... 342/357.04 |
| 6,268,824 B1 | | 7/2001 | Zhodzishky et al. |
| 6,313,789 B1 | | 11/2001 | Zhodzishsky et al. |
| 6,674,399 B2 | * | 1/2004 | Zhodzishky et al. ... 342/357.03 |
| 2003/0085839 A1 | * | 5/2003 | Zhodzishky et al. ... 342/357.12 |
| 2004/0130485 A1 | * | 7/2004 | Rapoport et al. ....... 342/357.03 |

OTHER PUBLICATIONS

Bisnath, S.B. et al., "A New Approach to an Old Problem: Carrier–Phase Cycle Slips", GPS World, May 2001, pp. 46–51, vol. 12, No. 5, USA.

Bisnath, S.B. et al., "Automated cycle–slip correction of dual–frequency kinematic GPS data", Proc. 47th Conf. of CASI, Apr. 30, 2000–May 3, 2000, pp. 121–125, Ottawa, Canada.

Bisnath, S.B., "Efficient, Automated Cycle–Slip Correction of Dual–Frequency Kinematic GPS Data", Proc. on ION GPS 2000, Sept. 2000, pp. 145–154, Utah, USA.

* cited by examiner

*Primary Examiner*—Dao Phan
(74) *Attorney, Agent, or Firm*—Jeffrey M. Weinick

(57) ABSTRACT

A method and apparatus for detecting and correcting anomalous measurements in a satellite navigation receiver is disclosed. Anomalous measurements are detected using the redundancy of observed satellite signals, or by analyzing the relationship between phase measurements at two frequencies when using dual frequency receivers. Upon determination that an anomalous measurement exists, the particular channel on which the anomalous measurement has occurred is determined. In addition, the extent of the anomalous measurement is estimated to produce an estimated error value. This information may then be used by the satellite navigation receiver in order to increase the accuracy of a navigation task.

56 Claims, 5 Drawing Sheets

METHOD AND APPARATUS FOR DETECTING ANOMALOUS MEASUREMENTS IN A SATELLITE NAVIGATION RECEIVER

This application claims the benefit of U.S. Provisional Application No. 60/536,872, filed Jan. 16, 2004.

BACKGROUND OF THE INVENTION

This invention relates generally to satellite navigation receivers and more particularly to the detection and correction of anomalous measurements in a satellite navigation receiver.

Satellite navigation systems, such as GPS (USA) and GLONASS (Russia), are well known in the art and are intended for highly accurate self-positioning of users possessing special navigation receivers. A navigation receiver receives and processes radio signals transmitted by satellites located within line-of-sight distance of the receivers. The satellite signals comprise carrier signals that are modulated by pseudo-random binary codes. The receiver measures the time delay of the received signal relative to a local reference clock or oscillator. These measurements enable the receiver to determine the so-called pseudo-ranges between the receiver and the satellites. The pseudo-ranges are different from the ranges (distances) between the receiver and the satellites due to various noise sources and variations in the time scales of the satellites and receiver. If the number of satellites is large enough, then the measured pseudo-ranges can be processed to determine the user location and coordinate time scales.

The requirement of accurately determining user location with a high degree of precision, and the desire to improve the stability and reliability of measurements, have led to the development of differential navigation (DN). In differential navigation, the task of finding the user position, also called the Rover, is performed relative to a Base station (Base). The precise coordinates of the Base station are known and the Base station is generally stationary during measurements. The Base station has a navigation receiver which receives and processes the signals of the satellites to generate measurements. These signal measurements are transmitted to the Rover via a communication channel (e.g., wireless). The Rover uses these measurements received from the Base, along with its own measurements taken with its own navigation receiver, in order to precisely determine its location. The location determination is improved in the differential navigation mode because the Rover is able to use the Base station measurements in order to compensate for the major part of the strongly correlated errors in the Rover measurements.

Various modes of operation are possible while using differential navigation. In post-processing (PP) mode, the Rover's coordinates are determined by co-processing the Base and Rover measurements after all measurements have been completed. This allows for highly accurate location determination because more data is available for the location determination. In real-time processing (RTP) mode, the Rover's coordinates are determined in real time upon receipt of the Base station information received via the communication channel.

The location determination accuracy of differential navigation may be further improved by supplementing the pseudo-range measurements with measurements of the phases of the satellite carrier signals. If the carrier phase of the signal received from a satellite in the Base receiver is measured and compared to the carrier phase of the same satellite measured in the Rover receiver, measurement accuracy may be obtained to within several percent of the carrier's wavelength. The practical implementation of those advantages, which might otherwise be guaranteed by the measurement of the carrier phases, runs into the problem of ambiguity resolution for phase measurements.

The ambiguities are caused by two factors. First, the difference of distances from any satellite to the Base and Rover is usually much greater than the carrier's wavelength. Therefore, the difference in the phase delays of a carrier signal received by the Base and Rover receivers may substantially exceed one cycle. Second, it is not possible to measure the integer number of cycles from the incoming satellite signals; one can only measure the fractional part. Therefore, it is necessary to determine the integer number of cycles, which is called the "ambiguity". More precisely, we need to determine the set of all such integer parts for all the satellites being tracked, one integer part for each satellite. One has to determine this set along with other unknown values, which include the Rover's coordinates and the variations in the time scales.

At a high level, the task of generating highly-accurate navigation measurements is formulated as follows: it is necessary to determine the state vector of a system, with the vector containing $n_\Sigma$ unknown components. Those include three Rover coordinates (usually along Cartesian axes X, Y, Z) in a given coordinate system (sometimes time derivatives of coordinates are added too); the variations of the time scales which is caused by the phase drift of the local main reference oscillator in the receiver; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite which broadcasts a carrier in the $L_1$ frequency band and a carrier in the $L_2$ frequency band. If the receiver processes the carrier signals in both of the $L_1$ and $L_2$ bands, a so-called dual-frequency receiver, the number of satellite channels (n) increases correspondingly. Dual-frequency receivers allow for ionosphere delay correction therefore making ambiguity resolution easier.

Two sets of navigation parameters are measured by the Base and Rover receivers, respectively, and are used to determine the unknown state vector. Each set of parameters includes the pseudo-range of each satellite to the receiver, and the full (complete) phase of each satellite carrier signal. Each pseudo-range is obtained by measuring the time delay of a code modulation signal of the corresponding satellite. The code modulation signal is tracked by a delay-lock loop (DLL) circuit in each satellite tracking channel. The full phase of a satellite's carrier signal is tracked by a phase-lock-loop (PLL) in the corresponding satellite tracking channel. An observation vector is generated as the collection of the measured navigation parameters for specific (definite) moments of time.

The relationship between the state vector and the observation vector is defined by a well-known system of navigation equations. Given an observation vector, the system of equations may be solved to find the state vector if the number of equations equals or exceeds the number of unknowns in the state vector. Conventional statistical methods are used to solve the system of equations: the least squares method, the method of dynamic Kalman filtering, and various modifications of these methods.

Practical implementations of these methods in digital form may vary widely. In implementing or developing such a method on a processor, one usually must find a compromise between the accuracy of the results and speed of obtaining results for a given amount of processor capability, while not exceeding a certain amount of loading on the processor.

One general scheme comprises the following steps. The measured values of the pseudo-ranges and full phases at specific (definite) moments of time, along with an indication of the satellites to which these measurements belong and the time moments of the measurements, are transmitted from the Base to the Rover. Corresponding values are measured in the Rover receiver. The processing includes the determination of the single differences of the pseudo-ranges and full phases between the Base and Rover measurements for each satellite. The strongly correlated errors are compensated (i.e., substantially cancelled) in the single differences. Then, the residuals of the single differences are calculated by subtraction of calculated values from the measured results. The processing of residuals allows one to linearize the initial system of navigation equations (sometimes several subsequent iterations are necessary), which makes possible the use of the well developed body of mathematics for solving systems of linear equations. The components of the state vector, with the n ambiguities included, are found as a result of the solution. But the calculated values of the ambiguities are not necessarily integer numbers, and are often floating point numbers. Because of this, they are called float ambiguities, or floating ambiguities, at this stage of the solution. To find true values of the integer ambiguities one uses the procedure of rounding off the float ambiguity vector to the nearest set of integers. This process is called the ambiguity resolution. Only after the ambiguity resolution has been done is it possible to determine the true values of residuals and then, by solving the system of equations again, to find the coordinate values for the baseline connecting the Base and Rover, and consequently to determine the exact coordinates of the Rover and the correction to its clock drift.

The above described general scheme of computations is well known in the art and is described in further detail, for example, in, Bradford W. Parkinson and James J. Spilker Jr., *Global Positioning Theory and Applications*, Volume 163 of Progress In Astronautics and Aeronautics, published by the American Institute of Aeronautics and Astronautics, Inc, Washington D.C., 1996.

In most cases the Rover receiver operates in a complicated environment in which various external influences cause measurement errors. For example, external signals may interfere with the satellite signals, and structures and terrain may result in multipath errors. We distinguish now between two types of errors, normal errors and abnormal errors. Normal errors are normally distributed white noise errors which may be compensated for during the location calculation. Abnormal errors are large systematic errors which may prevent the system from calculating an accurate location. Such abnormal errors are rarely a consequence of occasional spikes of intrinsic noise. More often, they are the result of severe exposure of the receiver. For example, strong reflected signals that interfere with the direct satellite signal would cause an abnormal error. Similarly, extreme radio interference may also result in abnormal errors. Partial or complete shading of the Rover receiver may also result in errors due to radio wave diffraction. If the shading is partial and minor, the measurement error may be minimal. However, if a satellite is completely shaded (i.e., blocked), all that remains is the multipath signal. As a result, tracking in the channel is interrupted and the measured phase is lost resulting in an abnormal error. Dynamic effects on the receiver (i.e., certain motion of the Rover) may also cause abnormal errors. Impulse accelerations impact both the receiving antenna and the quartz of the local reference oscillator resulting in drift of the intermediate carrier frequency and measured phase.

One specific type of abnormal error is a PLL cycle slip which is a cycle slip in the PLL circuits which are tracking the satellite carrier signal. After a cycle slip occurs, the PLL circuit transits to a new point of steady balance, after which it goes on with tracking the satellite carrier signal. As a result of a cycle slip, an abnormal error equal to several integer number of semi-cycles (half-cycles) is introduced into the full phase measurements. A cycle slip is characterized by two parameters, value and duration. The slip's value (in cycles) is determined by either 0.5K or K dependent on the PLL discriminator's type, where K is a random integer number. The duration of the cycle slip is also random. Minimal duration is defined by the PLL band while maximal duration depends upon the cause bringing about the cycle slip and can last up to several seconds. When the duration is long enough, tracking is lost.

There are various known techniques for detecting and correcting for cycle slip. For example, U.S. Pat. No. 5,502,641 discloses a method of detecting and correcting cycle slips caused by short-term blocking of satellite signals using phase extrapolation. In addition, S. Bisnath, D. Kim, and R. B. Langley, *A new Approach to an Old Problem: Carrier-Phase Cycle Slips*, GPS World, Vol. 12, NO. 5, pp. 46–51, discloses a technique of post-processing the recorded code and phase measurements at two frequencies (the $L_1$ and $L_2$ bands) and detecting cycle slips based on the spikes of time derivatives in the corresponding combinations of the recorded measurements.

BRIEF SUMMARY OF THE INVENTION

The present invention provides an improved method and apparatus for detecting anomalous phase measurements in a satellite differential navigation system. In accordance with one embodiment of the invention, a feedback loop is utilized to detect the anomalous measurements. In this embodiment, a phase difference vector is generated using the phase of the satellite signals as received at each of two satellite receivers. If the satellite receivers are single frequency receivers, then the phase difference vector generally represents the difference in phase as measured at each of the two satellite receivers. If the satellite receivers are dual frequency receivers, then the phase difference vector may be calculated using the difference in phase as measured at each of the two satellite receivers and further based on the relationship between the two frequencies. A phase mismatch vector is then generated, which represents the difference between the combined phase difference vector and an estimated combined phase difference vector. An averaged estimate vector representing the averaged estimate of the phase mismatch vector is generated. Next, a residual vector representing the difference between the phase mismatch vector and the averaged estimate vector is generated. A linear transformation of the residual vector and the averaged estimate vector provides a vector of controlling signals. Then, an estimated combined phase difference vector is generated by successively storing components of the vector of controlling signals for each of the satellite channels. Anomalous phase measurements are then detected by analyzing the residual vector.

The invention provides various techniques for analyzing the residual vector and therefore detecting anomalous phase measurements. In one embodiment, the anomalous phase measurements are detected by comparing residuals of the residual vector with a threshold and determining that a particular channel has an anomalous phase measurement if a residual associated with the particular channel exceeds the threshold. Once such a particular channel is found, further checking may be performed by eliminating that channel from further calculations of the phase difference vector and repeating the remaining steps until no residual exceeds the threshold, or until a threshold number of channels remain. Alternatively, anomalous phase measurements may be detected by generating a weighted sum of residual squares for the channels, comparing that weighted sum to a threshold, and determining that an anomalous phase measurement exists if the weighted sum exceeds the threshold. In accordance with this technique, the particular channel having the maximum residual may be considered as a channel having an anomalous phase measurement. Again, the identification of the particular channel may be checked by eliminating the channel from subsequent calculations of the phase difference vector and repeating the remaining steps until the weighted sum of residual squares does not exceed the threshold or until a threshold number of channels remain.

Upon identification of an anomalous phase measurement, the information about the anomalous phase measurement may be used by a satellite navigation receiver in order to increase the accuracy of a navigation task. In addition, a cycle slip estimate for a channel determined to have an anomalous phase measurement may be computed, and such cycle slip estimate may also be used in the navigation task.

In accordance with an another embodiment of the invention, anomalous phase measurements are detected using phase increments in adjacent measurements and without the feedback circuit of the first embodiment. In this embodiment, a combined phase difference vector is generated using the phase of the satellite signals as received at each of two satellite receivers. An increment vector is then generated, which represents the difference between the combined phase difference vector and the combined phase difference vector of a preceding iteration. An averaged increment estimate vector representing the averaged estimate of the increment vector is generated. Next, an incremental residual vector representing the difference between the increment vector and the averaged increment estimate vector is generated. An integrated residual vector is then generated from the incremental residual vector. Anomalous phase measurements are then detected by analyzing the integrated residual vector.

In accordance with yet another embodiment of the invention, anomalous phase measurements are detected based upon readings from channel indicators which are sensitive to sharp changes of signal amplitude or phase. Alarm signals associated with these channel indicators may indicate a significant probability of an anomalous measurement. In this embodiment, a combined phase difference vector is generated using the phase of the satellite signals as received at each of two satellite receivers. An increment vector is then generated, which represents the difference between the combined phase difference vector and the combined phase difference vector of an initial measurement. A corrected increment vector is then generated using a cycle slip correction estimate generated in a preceding iteration. Channel indicator alarms are analyzed and an averages increment estimate vector representing the averaged estimate of the corrected increment vector is generated using channels not associated with a channel indicator alarm. Next, a residual vector representing the difference between the corrected increment vector and the averaged increment estimate vector is generated. A cycle slip correction estimate is then generated using the residual vector.

These and other advantages of the invention will be apparent to those of ordinary skill in the art by reference to the following detailed description and the accompanying drawings.

DETAILED DESCRIPTION

Figure 1:
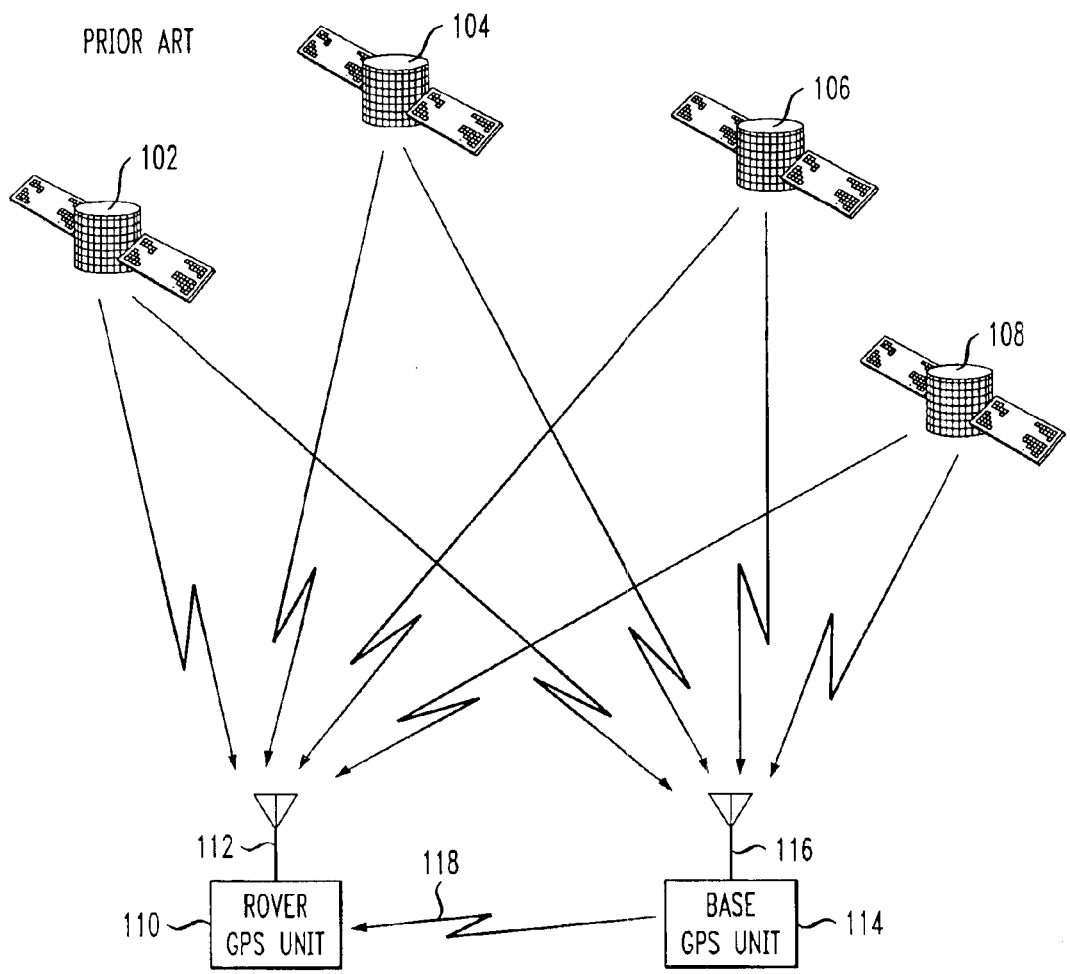
FIG. 1 shows a differential navigation system in which the principles of the present invention may be implemented.

FIG. 1 shows an illustrative well known differential navigation system in which the principles of the present invention may be implemented. The differential navigation system includes a Rover GPS unit 110 and a Base GPS Unit 114. The location of the Base 114 is known and the system is attempting to determine the location of the Rover 110. As is well known in the art, Rover 110 receives signals from satellites 102, 104, 106, 108 via antenna 112. Similarly, Base 114 receives signals from satellites 102, 104, 106, 108 via antenna 116. The Base 114 transmits differential correction signals to the Rover 110 via communication channel 118. Communication channel 118 may be, for example, a wired or wireless connection. The techniques for determining the location of the Rover 110 in the illustrative system shown in FIG. 1 are well known in the art, for example as described in, Bradford W. Parkinson and James J. Spilker Jr., *Global Positioning Theory and Applications*, Volume 163 of Progress In Astronautics and Aeronautics, published by the American Institute of Aeronautics and Astronautics, Inc, Washington D.C., 1996.

Figure 2:
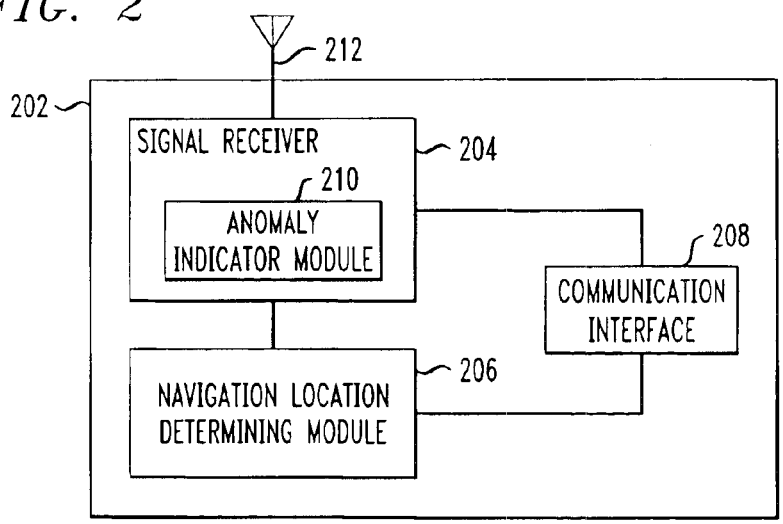
FIG. 2 shows a high level block diagram of a satellite receiver configured in accordance with one embodiment of the invention

As described above in the Background of the Invention, one of the problems with satellite navigation systems is the PLL cycle slip. In accordance one embodiment of the present invention, the Rover unit 110 is modified to add the functionality of a so-called anomaly indicator module in order to detect and correct for anomalous measurements, including anomalous phase error measurements. A high level block diagram of a satellite receiver configured in accordance with one embodiment of the invention is shown in FIG. 2. FIG. 2 shows a satellite receiver unit 202 comprising a signal receiver 204 for receiving satellite signals via antenna 212. The signal receiver 204 provides signal measurements to the navigation location determining module 206. The navigation location determining module performs the function of determining the location of the satellite receiver unit 202 using the measurements received from signal receiver 204. This function is sometimes referred to as the navigation task. The satellite receiver unit 202 also includes a communication interface 208 for communicating with other devices via a communication channel. For example, satellite receiver unit 202 receives information from the Base station via the communication interface 208. In accordance with an embodiment of the invention, the satellite receiver unit 202 also contains an anomaly indicator module 210 for performing steps in accordance with the principles of the present invention. It is to be understood that FIG. 2 is meant to show a high level functional block diagram of a satellite receiver unit for purposes of illustrating the principles of the present invention. There are, of course, other elements not shown which would be present in a satellite receiver unit. For example, a typical satellite receiver unit would include one or more processors for controlling the overall functioning of the unit. Such processors generally operate under the control of stored computer program code stored in a memory unit of the unit. Given the description herein, one skilled in the art would readily understand how to modify a well known satellite receiver unit in order to implement the principles of the present invention.

We note here that the term receiver is used in referring to both the GPS satellite receiver unit 202 and the signal receiver 204 which is part of the satellite receiver unit 202. One skilled in the art will recognize that these are different types of receivers. The satellite receiver unit 202 refers to the general unit used by a user to perform location functions by receiving and processing satellite signals, while the signal receiver 204 refers to a particular portion of the satellite receiver unit 202 which is a signal processing unit which receives signals via the antenna 212 and processes the signals (as described herein below) and sends certain signal measurements and parameters to the navigation location determining module for performance of the navigation task.

Prior to a detailed description of the anomaly indicator module, a high level description of the overall functions performed by the anomaly indicator module will be given.

The anomaly indicator module performs the following functions.

The first function of the anomaly indicator module is to detect the existence of an anomalous measurement in the satellite receiver. In performing this function, the redundancy of observed satellite signals is used. As is well known, in order to determine the location of the Rover, the Rover must receive signals from at least four satellites. Signals received from additional satellites in excess of four are redundant signals which are useful in the detection of anomalous measurements. We will therefore assume that the number of satellites observed simultaneously at the Base and Rover includes redundant satellites. As such, the phase measured in a particular satellite channel can be compared with an estimate of the phase obtained using other channel measurements. If the phase measurement of the particular satellite channel does not contain an abnormal error, then the difference between the measured phase and the estimated phase will not be too large. By establishing an appropriate threshold of acceptable difference, abnormal or anomalous phase measurements can be detected.

The redundancy of satellite signals may also be used by measuring the variance of phase measurements of the different channels relative to a mean estimate of all the channels and comparing this variance to a threshold. If the measured variance is greater than a permissible threshold, then an anomalous measurement is detected.

Another technique for detecting an anomalous measurement may be used when a dual frequency receiver measures phase at two different frequencies, for example the $L_1$ and $L_2$ frequency bands of a GPS satellite. In a dual frequency transmitter, the phase measurements at the two frequencies will have a definite relationship under normal conditions. A significant deviation from the definite relationship, e.g., greater than a predetermined threshold, may indicate an anomalous measurement.

Another technique for detecting an anomalous measurement is to use empiric data which indicates that an anomalous error may have been caused by a strong external influences on the satellite receiver. For example, such external influences may include signal shading or fading, and motion of the satellite receiver. As described above, such motion may affect the effectiveness of the antenna. Such motion may also affect the quartz of the reference oscillator in the satellite receiver. Such external influences may be tracked by special channel indicators sensitive to sharp changes of signal amplitude or phase. Alarm signals associated with these channel indicators may indicate a significant probability of an anomalous measurement.

Another function of the anomaly indicator module is to determine the particular channel on which the anomalous measurement has occurred. While some of the techniques described above for detecting that an anomalous measurement exists will also identify the particular channel on which it occurred, others of the techniques will not identify the particular channel on which the anomalous measurement has occurred. For example, the use of channel indicator alarms will identify the particular channel on which the anomalous measurement has occurred. However, consider the above described technique of comparing the measured variance relative to the mean estimate with a threshold. An anomaly detected in this manner suggests the particular channel on which the anomaly occurred because of the deviation of the particular channel's measurement from the mean. However, it is useful to perform another check on the identified channel. The verification is carried out by eliminating the suspected channel in the calculation of the mean. If, as a result of this elimination, the variance is reduced and is less than the threshold then the anomalous measurement is assumed to be found. Alternatively, if, as a result of the elimination, the variance is not less than the threshold, then the identified channel is unlikely the channel with the anomalous measurement. In this case, another likely candidate channel is eliminated. This other likely candidate channel may be chosen as the channel with the next largest deviation from the mean. Upon replacing the candidate channel, in various embodiments the originally excluded channel may either be restored into the calculation of the mean or it may remain excluded. This technique may be repeated until the channel with the anomalous measurement is found.

Another function of the anomaly module is to estimate an error value which represents the extent of the anomalous measurement. Knowledge of the extent of the error may be useful in increasing the accuracy of the location function of the satellite receiver. Appropriate corrections may be provided from the anomaly indicator module 210 (FIG. 2) to the navigation location determining module 206 in order to correct for the abnormal errors during the navigation task.

Again, referring to the error detection technique of comparing the measured variance with the threshold, if the channel with the anomalous measurement has been found and removed from the computation of the mean, then the deviation of the channel's measurement from the mean can be considered as an estimate of the abnormal error on that channel. However, in the general case, such an estimate is generally not useful in determining corrections because it does not contain any new information and does not increase navigation location determining accuracy compared with simply removing that channel from the location determination.

Anomalous error due to cycle slip, however, is an exception to the general case. After a cycle slip, the channel PLL continues tracking in normal mode. Since the cycle slip error is known to be a discrete value equal to an integer number of semi-cycles, the deviation of the measurement of the anomalous channel from the mean may be very useful.

Having provided an overview of the functioning of the anomaly indicator module, further details of the functioning of the anomaly indicator module will now be provided. Prior to a description of the further details, we will provide an introduction to the nomenclature used. We use subscript j to indicate a channel number, where j is either within limits from 1 to N where N is the full number of actual satellite channels or within limits from 1 to n<N where n is the number of satellite channels left after eliminating the channels with anomalous measurements. The symbol i is used in brackets on the right to indicate the number of discrete time measurements, where i increases by 1 in each successive clock pulse (we note here that in some equations i is omitted for the sake of clarity). Vectors are indicated in bold.

We now describe in further detail the several embodiments of an anomaly indicator module in accordance with the principles of the present invention.

Figure 3:
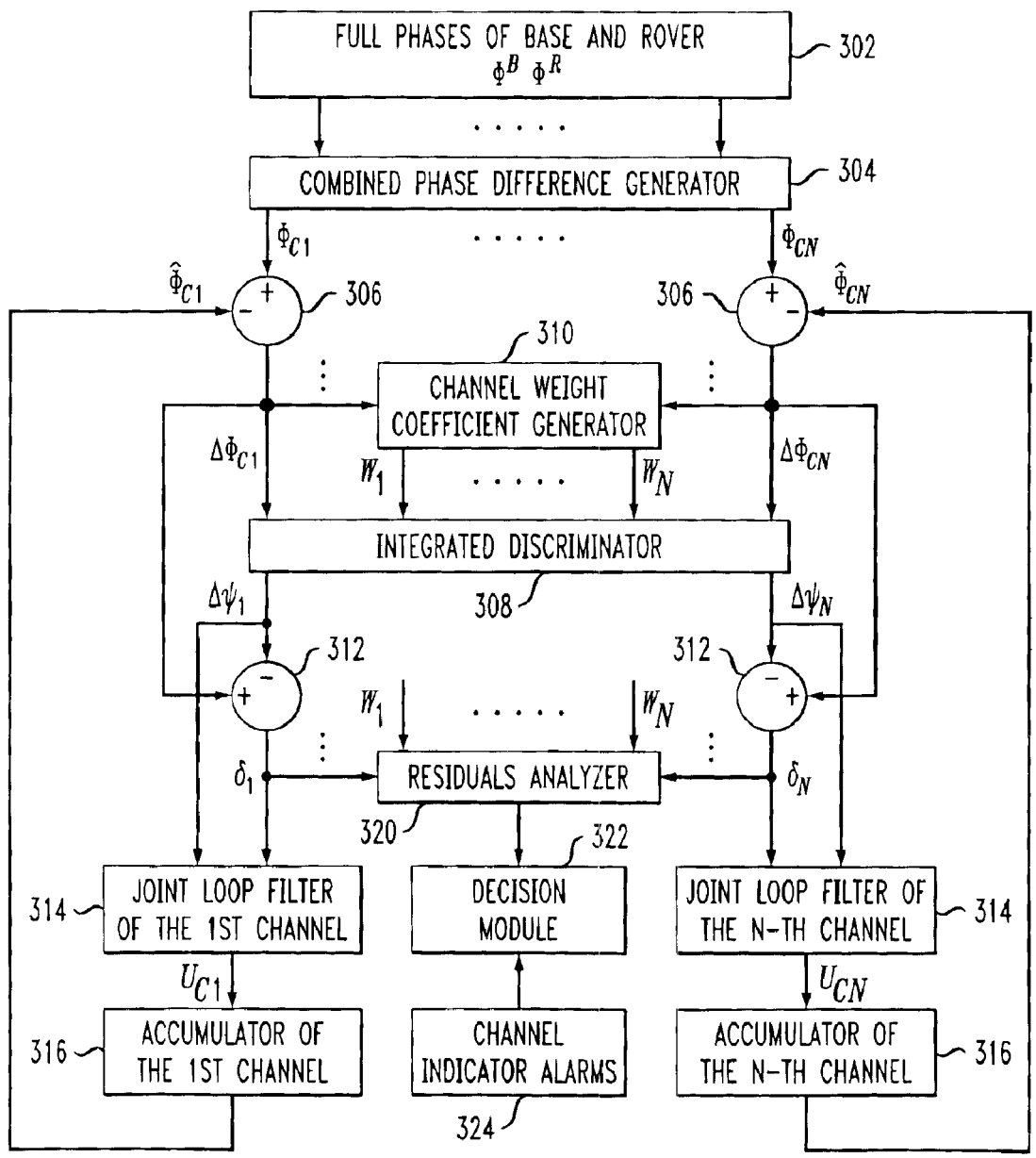
FIG. 3 shows a function block diagram of a first embodiment of an anomaly indicator module which utilized a feedback loop.

FIG. 3 shows a functional block diagram of a first embodiment of an anomaly indicator module 300 which utilizes a feedback loop. FIG. 3 only shows details for channels 1 and N since the processing of all channels is the same. Function blocks which are common to all channels are also shown. It is noted that the functional block diagrams (e.g., FIGS. 2–6) herein are meant to describe high level functioning of a unit. One skilled in the art would readily recognize that some of the blocks represent input parameters, others represent output parameters, while others represent some function or operation. The functions and operations may be performed by hardware circuits, software instructions executing on a processor, or some combination of hardware and software. Given the description herein, those skilled in the art would be able to implement the described functionality using various combinations of hardware and software. As such, implementation details of the functions described herein will not be described in detail as such implementation details would be readily known to one skilled in the art.

As represented in block 302, the inputs to the anomaly indicator module 300 are the full phases measured by the Base receiver ($\Phi^B_j(i)$) and the full phases measured by the Rover ($\Phi^R_j(i)$) for every i-th clock and for each j-th satellite, where j is from 1 to N, and where N is the number of satellites being simultaneously tracked by the Base and Rover.

The clock is determined by the time instances when Base measurements are received by the Rover via the communication channel. The time interval ($\Delta t$) between adjacent transmitted measurements is generally equal to approximately 0.2–1.0 s.

A set of phase combinations is generated each clock from the input data for all the satellite channels by the combined phase difference generator 304. The combined phase differences ($\Phi c_1 \ldots \Phi c_j \ldots \Phi c_N$) may be considered as components of the N-dimensional vector $\Phi c$, and the calculation of these differences may vary depending on the implementation. For example, in a single-frequency receiver $\Phi c$ is merely single-phase differences, that is $$\Phi c = \Phi^B - \Phi^R \qquad (1)$$

where vector $\Phi^B$ contains components ($\Phi_{B1} \ldots \Phi_{Bj} \ldots \Phi_{BN}$) which are the full phases measured by the Base for each j-th channel and vector $\Phi^R$ contains components ($\Phi_{R1} \ldots \Phi_{Rj} \ldots \Phi_{RN}$) which are the full phases measured by the Rover for each j-th channel.

In a dual-frequency receiver the combined phase difference $\Phi c_j$ for each j-th channel is generated using phase measurements at two frequencies as set forth in equation (2) below:

$$\Phi c_j = (\Phi^B_{2j} - \Phi^R_{2j}) - (\Phi^B_{1j} - \Phi^R_{1j})(f2/f1), \qquad (2)$$

where subscript 1 relates to frequency f1 in the L1 band and subscript 2 relates to frequency f2 in the L2 band.

Next, operators 306 generate the phase mismatches vector $\Delta \Phi c$ by subtracting from combined phase difference $\Phi c$ the estimate $\hat{\Phi} c$ formed in the feedback circuit and received from the accumulator 316 (described in further detail below).

The phase mismatches ($\Delta \Phi c$) of all channels are provided to an integrated discriminator 308. This integrated discriminator 308 operates as a linear operator and generates an averaged estimate $\Delta \Psi$ of vector $\Delta \Phi c$ over all satellite channels. Using either equation (2) or equation (1) with a stationary Rover, the averaged estimate $\Delta \Psi$ is the same for all channels and may be computed by equation (3) as follows:

$$\Delta \Psi = \left( \sum_{j=1}^{N} w_j \cdot \Delta \Phi c_j \right) \bigg/ \left( \sum_{j=1}^{N} w_j \right) \qquad (3)$$

where $w_j$ is a weight coefficient of the j-th channel. The weight coefficients of channels characterize the accuracy of measurements and are generated by the channel weight coefficient generator 310 and may be determined by various methods. The first method for generating the weight coefficients is based upon direct measurements in each channel of the satellite receiver during operation. According to this method, the coefficients ($w_j$) are determined as values inverse to the variance $\sigma_j^2$ of the phase mismatches $\Delta \Phi c_j$, where variance $\sigma_j^2$ is determined in each j-th channel by smoothing the squares of phase mismatches. The squares of phase mismatches are squared by utilizing a first-order digital filter, whose time constant is sequentially increased up to approximately a few tens of seconds. According to a second method, weight coefficients ($w_j$) are again determined as values inverse to the variance $\sigma_j^2$ of phase mismatches $\Delta \Phi c_j$, but in this embodiment the variance $\sigma_j^2$ is calculated as previously described only for the z-th channel. It is advantageous to choose the z-th channel as the channel tracking the satellite that is as close to the zenith as possible. As to the remaining (j-th) channels, the variance is calculated according to equation (4) as follows:

$$\sigma_j^2 = \sigma_z^2 (\sin \theta_z / \sin \theta_j) \qquad (4)$$

where $\theta_z$, $\theta_j$ are elevation angles of the z-th and j-th satellites respectively. Equation (4) is based upon empirical data indicating that the greater the satellite elevation angle, the higher the accuracy of measurements that is obtained from the satellite.

In the case of a moving Rover (operating in so-called kinematic mode) the integrated averaged estimates $\Delta\Psi_j$ are different for different channels. The operation of the integrated discriminator 308 is described by equation (5) as follows:

$$\Delta\Psi = H \cdot G \cdot \Delta\Phi c \quad (5)$$

where H is a matrix of directional cosines between the Rover and satellites. This matrix contains 4 columns (according to the components of the state vector) and N rows (according to satellite channels). The elements of the first three columns are directional cosines while the fourth column is the unit column. Matrix G is defined by the least-square method according to equation (6) as follows:

$$G = (H^T R^{-1} H)^{-1} H^T R^{-1}, \quad (6)$$

where R is a covariance matrix of phase mismatches with dimension N*N and contains elements $\sigma_j^2$ (where j is from 1 to N) in the main diagonal while the remaining elements are zero. Operator 312 performs the function of subtracting from phase mismatches $\Delta\Phi c$ (received from operators 306) their generalized/integrated estimates $\Delta\Psi$ (received from integrated discriminator 308) to generate residuals $\delta$.

The residual $\delta_j$ along with the phase mismatch $\Delta\Psi_j$ pass through a joint loop channel filter 314 (described in further detail below in conjunction with FIG. 4) to generate a controlling signal $U_c$. These controlling signals are further stored in the accumulator 316 which generates the estimates of the phase mismatches $\hat{\Phi}$, thus closing the feedback loop of the anomaly indicator module 300.

The function of the accumulator 316 (from the first to i-th clock) is as described by the following equation (7):

$$\hat{\Phi}_{cj}(i) = \sum_{k=0}^{i} U_{cj}(k) \quad (7)$$

It is noted that in order to avoid the influence of ambiguity, the accumulator 316 is initialized such that at i=0, phase mismatch $$U_{cj}(0) = \Phi c_j(0) \quad (8)$$

is stored in the accumulator.

Figure 4:
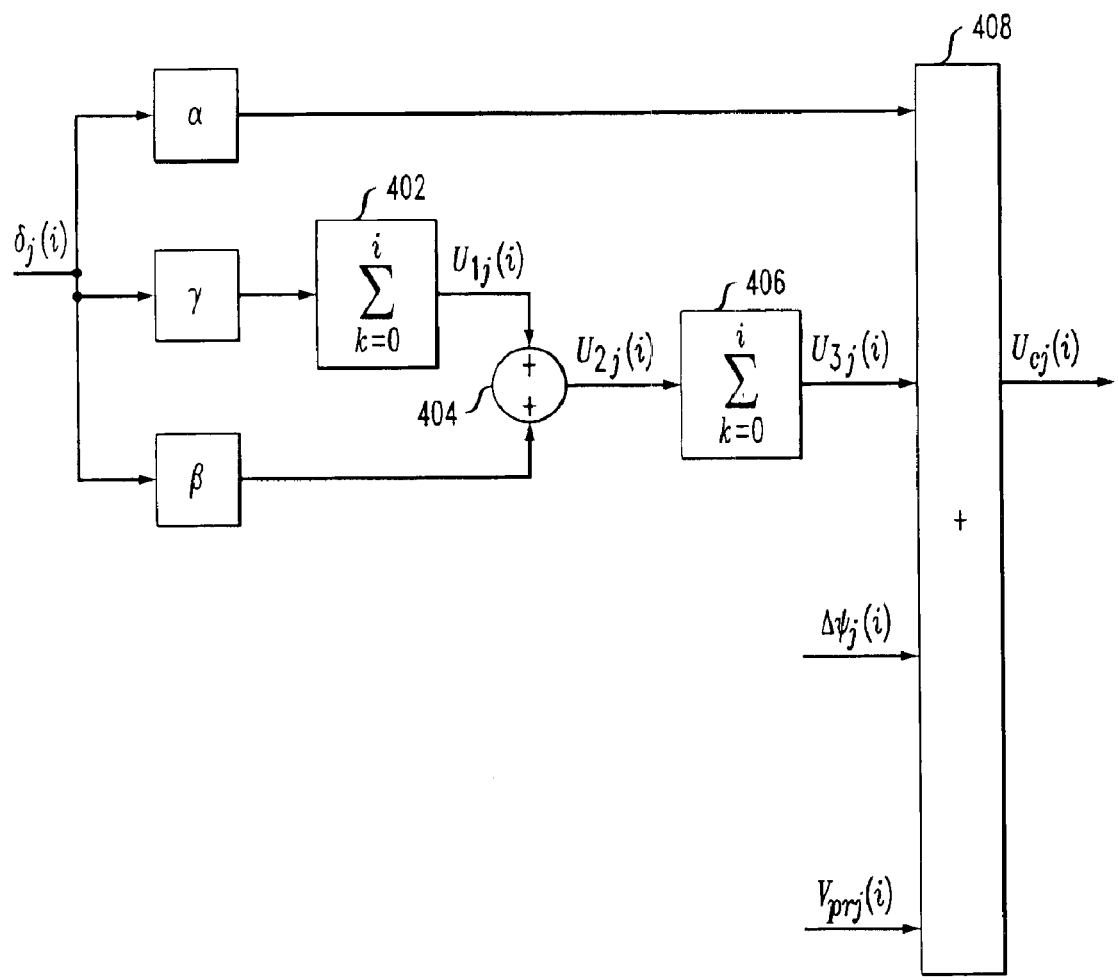
FIG. 4 shows a block schematic diagram of a joint loop filter.

FIG. 4 shows a block schematic diagram of further details of the joint loop filter 314 for the j-th channel. The functioning of the joint loop filter 314 for the j-th channel is as follows. The joint loop filter receives as input $\delta_j(i)$ (from operator 312), $\Delta\Psi_j(i)$ (from integrated discriminator 308), and $V_{prj}(i)$ (which is predicted as described below). First, block 402 generates $U_{1j}$ as, $$U_{1j}(i) = \sum_{k=0}^{i} \gamma \delta_j(k) \quad (9a)$$

Then, operator 404 generates $U_{2j}(i)$ as, $$U_{2j}(i) = \beta \delta_j(i) + U_{1j}(i) \quad (9b)$$

Then, block 406 generates $U_{3j}(i)$ as, $$U_{3j}(i) = \sum_{k=0}^{i} U_{2j}(k) \quad (9c)$$

Finally, block 408 generates $U_{cj}(i)$ as, $$U_{cj}(i) = \Delta\Psi_j(i) + \alpha\delta_j(i) + U_{3j}(i) + V_{prj}(i), \quad (9d)$$

where $V_{prj}(i)$ is a predicted value computed on the basis of a priori data, and $\alpha, \beta, \gamma$ are the coefficients of the loop filter.

If the generalized/integrated averaged estimate $\Delta\Psi$ is the same for all the channels and is computed as a weighted sum of phase mismatches according to equation (3), then the predicted value $V_{prj}(i)$ in equation (9d) is not needed by block 408 (i.e., $V_{prj}(i)=0$). In a situation in which the Rover is moving, equation (5) is used by the integrated discriminator 308 and the predicted value $V_{prj}(i)$ is computed as the difference of increments in carrier phases (over the time interval between adjacent measurements) of the signal received by the Base and Rover receivers. Such difference in increments arises as a result of the orbital movement of the j-th satellite. It is noted that the joint loop filters are the same for all of the channels.

In various embodiment, the coefficients $\alpha, \beta, \gamma$ of the loop filter may be selected by various methods. One method is to assume that the coefficients are constant values. Advantageous values for these coefficients are as follows:

$$\alpha = (8/3) \cdot F \cdot \Delta t, \ \beta = \alpha^2/2, \ \gamma = \alpha^3/10, \quad (10)$$

where $\Delta t$ is the interval between the adjacent measurements and F is the desirable bandwidth of the loop filter (advantageously F may be in the range F=0.01 . . . 0.05 Hz). Another method of selecting the coefficient indicates that the coefficients be time-dependent such that the anomaly indicator module's loop would form a Kalman filter with a narrowing/reducing band in each channel. The Kalman filter is created in a conventional manner as is well known in the art. The use of the following initial conditions is advantageous:

Measurement noise is discrete white noise with RMS in the range RMS=0.05 . . . 0.1 cycle. The dynamic model of the process tracked is represented as a result of passing discrete white noise through two serial accumulators with the RMS of initial white noise being selected so that the steady-state band of the Kalman filter is within 0.001 . . . 0.005 Hz.

Returning now to FIG. 3, we will describe several alternative embodiments of the residuals analyzer 320.

First, consider the case where the integrated discriminator 308 generates the average estimate of phase mismatches $\Delta\Psi$ according to equation (3). In a first embodiment of the residuals analyzer 320, it is assumed that if there is an anomalous phase measurement by the receiver, then there will be an anomalous residual as well. This anomalous residual will considerably exceed the residuals typical of expected measurements. Thus, an anomalous measurement is considered to be detected if in at least one channel the absolute value of the residual is greater than a threshold. An advantageous threshold is in the approximate range of 0.2 . . . 0.25 cycles. Once a residual which exceeds the threshold is detected on a particular channel, the channel is eliminated from the calculation of phase mismatches in the combined phase difference generator 304 and the analysis is repeated using the reduced number of channels n=N−1 The repeated analysis will result in different channel residuals. If the anomalous measurement was in a single channel only, and this channel is eliminated, then there will be no channels having residuals exceeding the threshold. If however, after removal of a channel, there still exist channels having residuals exceeding the threshold, then this suggests that there is an anomalous measurement in at least one of the remaining channels. Once again, the channel with the residual exceeding the threshold is eliminated from the calculation of phase mismatches in the integrated discriminator 308 and the analysis is again repeated using the reduced number of channels n=N−2. This procedure is repeated until either the threshold is no longer exceeded or the number of remaining channels is minimally redundant, for example when there are only 2 channels remaining.

A second embodiment of the residual analyzer is based upon verifying the so-called criterion $\chi^2$ in which a weighted sum of residual squares is compared to the threshold. In this embodiment, the weighted sum is calculated according to equation (11):

$$\chi^2 = \sum_{j=1}^{n} w_j (\delta_j)^2, \quad (11)$$

where $w_j$ is the weight coefficient of the j-th channel as shown above, n is the number of remaining channels (i.e., n will be equal to N at the outset, and may be reduced as a result of eliminating channels from the phase mismatch calculation as described above). If the phase mismatches $\Delta\Phi c_j$ are normal random values independent in different channels, then the weighted sum of residual squares $\chi^2$ has distribution according to $\chi^2$-law with (n−2) degree of freedom. The corresponding distribution ($\chi^2$-law) may be determined by well known techniques. Based on the probability distribution law one can determine the threshold $\pi_z$ to which the value $\chi^2$ is to be compared to result in a relatively small acceptable probability of false alarm. For example, an appropriate threshold is approximately $P_{fa}$=0.01 . . . 0.05, where $\chi^2$ is calculated by equation (11). If the threshold is exceeded, then it is determined that an anomalous measurement has been detected. Once the anomalous measurement is detected, a determination of the particular channel having the anomalous measurement is made by repeatedly removing channels from the $\chi^2$ calculation in a manner similar that as described above in accordance with the first described embodiment of the residual analyzer 320.

A third embodiment of the residual analyzer is also based on criteria $\chi^2$, but locates the channel with the anomalous measurement in a different way. Once the threshold has been exceeded, it is assumed that an anomalous measurement exists in one channel only and the channels are eliminated one by one. However, upon eliminating a particular channel and recalculating $\chi^2$, if the threshold remains exceeded using the remaining n=N−1 channels, then the particular channel is returned to the set of channels used in the calculation of $\chi^2$ and a second channel is eliminated. Again, $\chi^2$ is recalculated with the remaining n=N−1 channels. A first search continues in this manner until either the one channel having the anomalous measurement is found, or after eliminating all channels and the threshold continuing to be exceeded, it is determined that more than one channel has an anomalous measurement. In the latter case, a second search is initiated now eliminating channel pairs and computing $\chi^2$ using n=N−2 channels. A second search continues in this manner until either the two channels having the anomalous measurements are found, or after eliminating all channel pairs and the threshold continuing to be exceeded, it is determined that more than two channels have anomalous measurements. In the latter case, a third search is initiated now eliminating channels in groups of three and computing $\chi^2$ using n=N−3, and searching again as described above. Searching continues in this manner until either all the channels that contain anomalous measurements are found, or the number of the channels remaining is equal to two.

The three above described embodiments of the residuals analyzer 320 are appropriate where the integrated discriminator 308 generates the average estimate of phase mismatches $\Delta\Psi$ according to equation (3). The operation of the residual analyzer 320 is altered as follows if the integrated discriminator 308 generates the average estimate of phase mismatches $\Delta\Psi$ according to equation (5). First, the search is stopped when the number of remaining channels is five. Second, the degree of freedom for the calculation of the threshold $\pi_z$ in the second and third residuals analyzer embodiments described above is n−4. Third, each time a new channel or channels is eliminated from the calculation, the integrated discriminator 308 recalculates matrix G using the remaining channels. In yet another alternative, in the case in which the receiver is a dual-frequency receiver and phase difference is calculated using equation (1), if the search stops when the number of channels reaches five, it may be continued by calculating phase difference with equation (2) rather than equation (1). This results in locating more channels with anomalous measurements.

Following the analysis of the residuals, the decision module 322 makes a decision based on the analysis. In one embodiment, the decision may be to merely transfer to the navigation location determining module 206 (FIG. 2) the information so far obtained about the anomalous measurements so that the navigation location determining module 206 may consider this information in solving the navigation task. If the combined phase difference is defined by equation (1), then the anomaly indicator module can also calculate an estimate of cycle slips to allow the navigation location determining module 206 to correct for such cycle slip. The estimate $\Phi c^5(i)$ is based upon rounding the residuals and may be calculated as follows:

$$\Phi c^5(i)=0.5 \text{ round}(\delta(i)/0.5), \quad (12)$$

where $\Phi c^5(i)$ is the vector of estimates (in semi-cycles) of anomalous errors (cycle slips), $\delta(i)$ is the vector of residuals for the deleted channels, and round ( . . . ) is the operation of rounding to the nearest integer.

In addition, the anomaly module can transfer to the navigation location determining module 206 information about channel indicator alarms 324 that mark the appearance of strong perturbations in the channels. These alarms are received from the channel indicators which operate as described below.

One skilled in the art would recognize that the navigation location determining module 206 may use the information received from the anomaly indicator module 210 in various ways. For example, the navigation location determining module 206 may miss ignore an i-th measurement, eliminate corrupted channels or give them less weight, apply corrections to slips, or use the measurements of all the channels in coordinate determination.

We now describe the operation of the channel indicators. The task of the channel indicators is to detect disturbance in the satellite channels that may cause anomalous phase measurements and to mark (i.e., flag) the channels with an alarm.

A distinction can be made between amplitude and dynamic disturbances. Amplitude disturbance, for various reasons, results in a considerable reduction of satellite signal amplitude at the input of the receiver. Partial or full shading by any local object may cause amplitude disturbance. Such shading corresponds to changing the measured phase. Full shading follows a semi-shade interval, during which the signal is received only by diffraction. This results in the length of the radio wave becoming longer and the appearance of a large phase change. Full shading causes the PLL to open and the guided/controlled generator changes its phase and frequency due to noise and a reflected signal that comes from a different direction and thereby may be unshaded.

Under strong multi-path conditions the interference of direct and reflected signals results in simultaneous amplitude fading and phase fluctuation. Deep amplitude disturbance and corresponding anomalous phase errors are especially noticeable when the Rover is close to urban buildings or among trees. Such errors tend to occur more often in the channels tracking satellites at low elevation.

Dynamic disturbance arises as pulse accelerations (i.e., motion) of the moving Rover, which may be caused, for example, by road shocks and vibrations due to nearby equipment. Such accelerations affect the receiver's antenna and the reference oscillator quartz. Motion of the antenna results in a change in the received signal phase. The magnitude of this change is proportional to a double time interval of the scalar multiplication product of two vectors, namely the acceleration vector occurring during the motion/shock and the range-to-satellite vector. It should be noted that the phase change would differ for different satellite channels.

The shock of the quartz due to piezoelectric effect results in changing the reference oscillation frequency. The value of this frequency change depends on g-sensitivity of the quartz and the angle between the main quartz's axis and the shock-acceleration vector.
Correspondingly, the phase change is proportional to the integral of acceleration and is the same for all satellite channels.

Joint action of diverse perturbations and intrinsic noise normally leads to anomalous errors, which, however, do not take place simultaneously in different channels and at various carrier frequencies.

In order to detect a perturbation in the channel, the channel indicators analyze quadrature components of the received signal (I,Q). The methods of analysis are known to be dependent on the task being solved. The specific feature of the case under consideration is the fact that false lock is less dangerous than missing. This results from redundancy in the number of satellite channels and the fact that the validity of alarms can be verified by other methods. In addition, the channel indicator does not need to distinguish between amplitude and dynamic perturbations, and there are no strict limitations on the permissible delay of alarm signals. The elimination of the channel in the anomaly indicator module does not necessarily indicate that the channel will be deleted from solving the navigation task, which would bring about reducing the accuracy of coordinate measurements.

One embodiment of a channel indicator for use in implementing the present invention consists of two parts, an angle indicator and an amplitude indicator. The angle indicator compares the value $Z_d=abs(arctan(Q/I))$ to a threshold which may approximately coincide with the PLL discriminator. In standard mode $Z_d$ would seldom exceed approximately 0.1 . . . 0.2 radian if components I and Q are smoothed during the PLL adjustment period (generally approximately 5 . . . 10 ms).

In amplitude fading $Z_d$ increases sharply due mainly to a reducing I component. Dynamic disturbance is characterized by errors of absolute value Q due to dynamic error of the PLL. Thus, establishing an approximate threshold of 0.7 . . . 0.9 radian, alarms from the angle indicator at different types of amplitude and dynamic perturbations may be obtained.

The angle indicator may miss a perturbation if, during the shading of the satellite, the PLL gradually transits to tracking a weaker reflected signal that has its own Doppler shift and can take the phase far away. Thus, it is expedient to supplement the angle indicator with the amplitude indicator.

The amplitude indicator measures value $Z_d=I^2+Q^2$ which estimates power of the received signal. This value is smoothed for approximately 100 . . . 200 ms and compared with a threshold which has been established for noise, considering a preset minimal admissible signal strength. The amplitude indicator generates an alarm if the power estimate drops below the threshold. Finally the channel alarm signal is generated if there are alarms in the angle or amplitude indicators.

Figure 5:
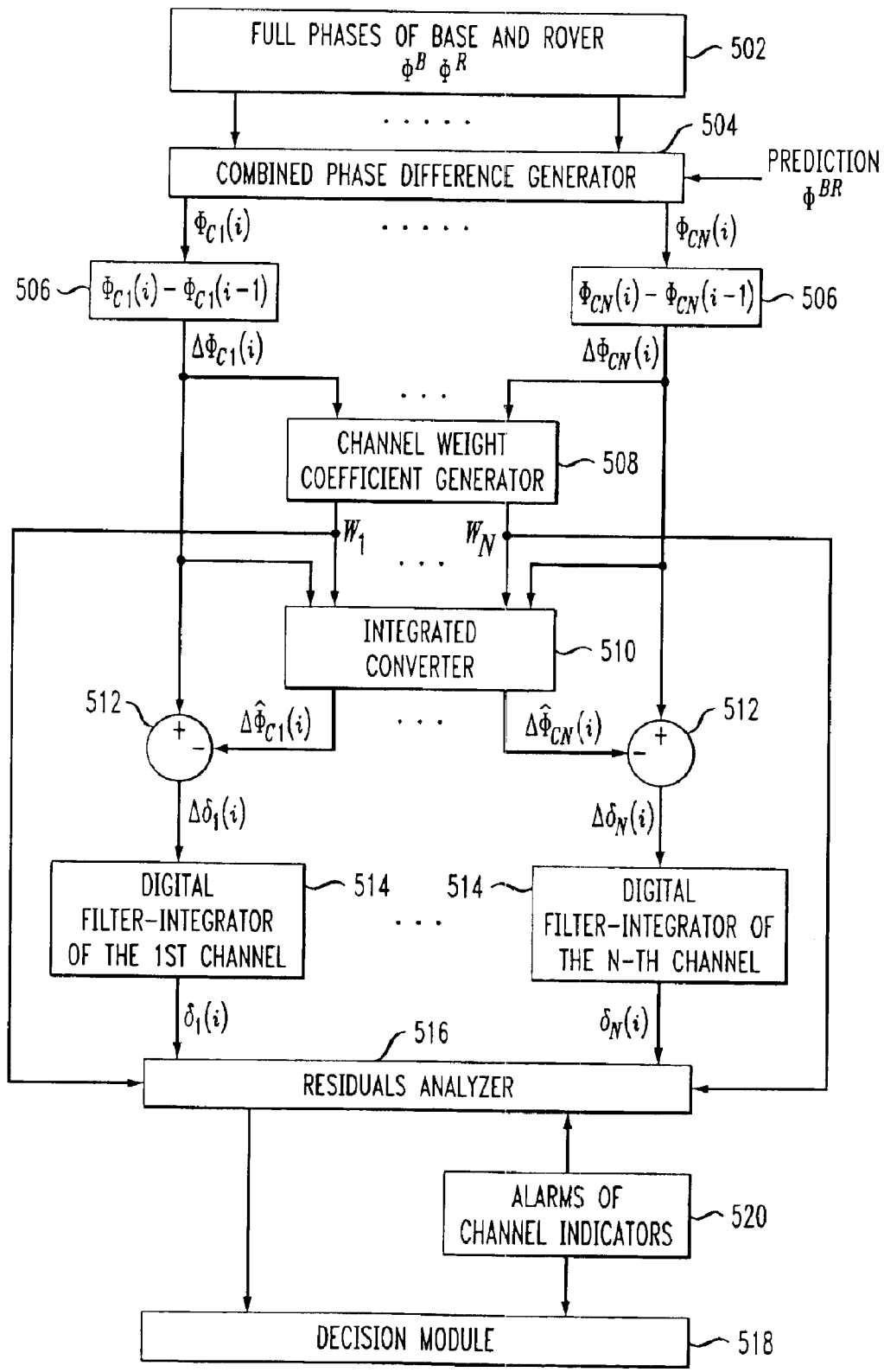
FIG. 5 shows a functional block diagram of a second embodiment of an anomaly indicator module which operates on phase increments in adjacent measurements.

FIG. 5 shows a functional block diagram of a second embodiment of the anomaly indicator module which operates on phase increments in adjacent measurements. This embodiment of the anomaly indicator module does not have the feedback circuit of the first embodiment (FIG. 3). The anomaly indicator and operates discretely with the clock which is determined by the Base measurements received via a communication link. The anomaly indicator operates upon receipt of a measurement from the Base.

As represented in block 502 the inputs of the anomaly indicator module are single differences of full phases measured at the Base and Rover for each satellite. The combined phase difference generator 504 generates a vector $\Phi c(i)$ of combined phase difference at each i-th measurement as follows:

$$\Phi c(i)=\Phi^B(i)-\Phi^R(i)-\Phi^{BR}(i), \tag{13}$$

where $\Phi^{BR}_j(i)$ is a prediction of satellite movement calculated in a well known manner based on a priori data. Next, operator 506 generates an increment vector based on the input vector over time intervals between adjacent measurements as follows:

$$\Delta\Phi c(i)=\Phi c(i)-\Phi c(i-1) \tag{14}$$

It is noted that these generated increments do not have ambiguity. The value of the increments and their slow change in time are based, mainly, on prediction errors and quartz fluctuations in receivers.

Channel weight coefficient generator 508 calculates weight coefficients of the channels by using the increment vector $\Delta\Phi c(i)$. Since increments $\Delta\Phi c(i)$ contain slow-altering components, these components should be eliminated before calculating variance $\sigma_j^2$. To isolate the slow-altering components, one can use the smoothing with first or second-order polynomial over moving/sliding interval that lasts a few tens of seconds.

The increments $\Delta\Phi c(i)$ are passed to the integrated converter 510 where averaged increment estimates $\Delta\hat{\Phi}(i)$ are generated by the method of least squares as follows:

$$\Delta\hat{\Phi}(i)=H(i)\cdot G(i)\cdot\Delta\Phi c(i) \tag{15}$$

where H and G are matrices as described above.

Operator 512 generates an incremental residual Δδ(i) by calculating the difference between an increment and its estimate as follows:

$$\Delta\delta(i)=\Delta\Phi c(i)=\Delta\hat{\Phi}(i) \quad (16)$$

The next step is to move from increment residuals to integrated residuals. It is necessary to give the anomaly indicator module an opportunity to detect an anomalous error that grows so slowly that its influence on the increment residuals is hidden by noise.

Integrated residuals δ(i) are generated by the filter-integrator 514 as follows:

$$\delta(i)=A\cdot\delta(i-1)+\Delta\delta(i), \quad (17)$$

where A is a coefficient that determines time constant and the gain of the filter-integrator, where A<1. The recommended value for A is in the range A=0.995 ... 0.999. In normal mode the integrated residuals represent small noise fluctuations. When an anomalous measurement appears the integrated residual of the corresponding channel increases and the sum of squares residuals between channels also increases.

The residuals analyzer 516 and the decision module 518 may operate in a manner similar to that described above in accordance with the residuals analyzer 320 and decision module 322 of FIG. 3. However, in the embodiment under present discussion, the operations of the residuals analyzer 516 and decision module 518 must be carried out with the integrated residuals.

It is also possible to use the $\chi^2$ criteria (as described above) only to determine the existence of anomalies, and to use channel indicator alarms 520 to determine the location of the channel on which the anomaly has occurred. (It is noted that this alternative is also applicable to the first and third embodiments of the anomaly indicator.) In accordance with this alternative, all channels marked with alarm flags are eliminated from the anomaly indicator module's calculations as described above, and then the above described $\chi^2$ criteria is utilized for the remaining channels. Depending on the result, the following decisions can be made.

If the number of channels remaining is not less than four and $\chi^2$ is less than the threshold $\pi_z$, then in addition to transferring information about the corrupted channels to the navigation location determining module 206, the decision module 518 can also measure anomalous errors in those channels using equation (12) to apply cycle-slip-corrections to Φc(i). After applying the corrections, the residuals analyzer 516 can again use the $\chi^2$ criteria to assess the corrections applied. Further, it is possible to continue verifying the validity of the channel alarms by, for example, returning certain channels previously eliminated from the anomaly indicator module's calculations, when the flags/alarms of the amplitude and angle indicators were different. It is noted that if it is impossible to satisfy $\chi^2$ criteria then i-th measurement should be considered as uncertain.

Figure 6:
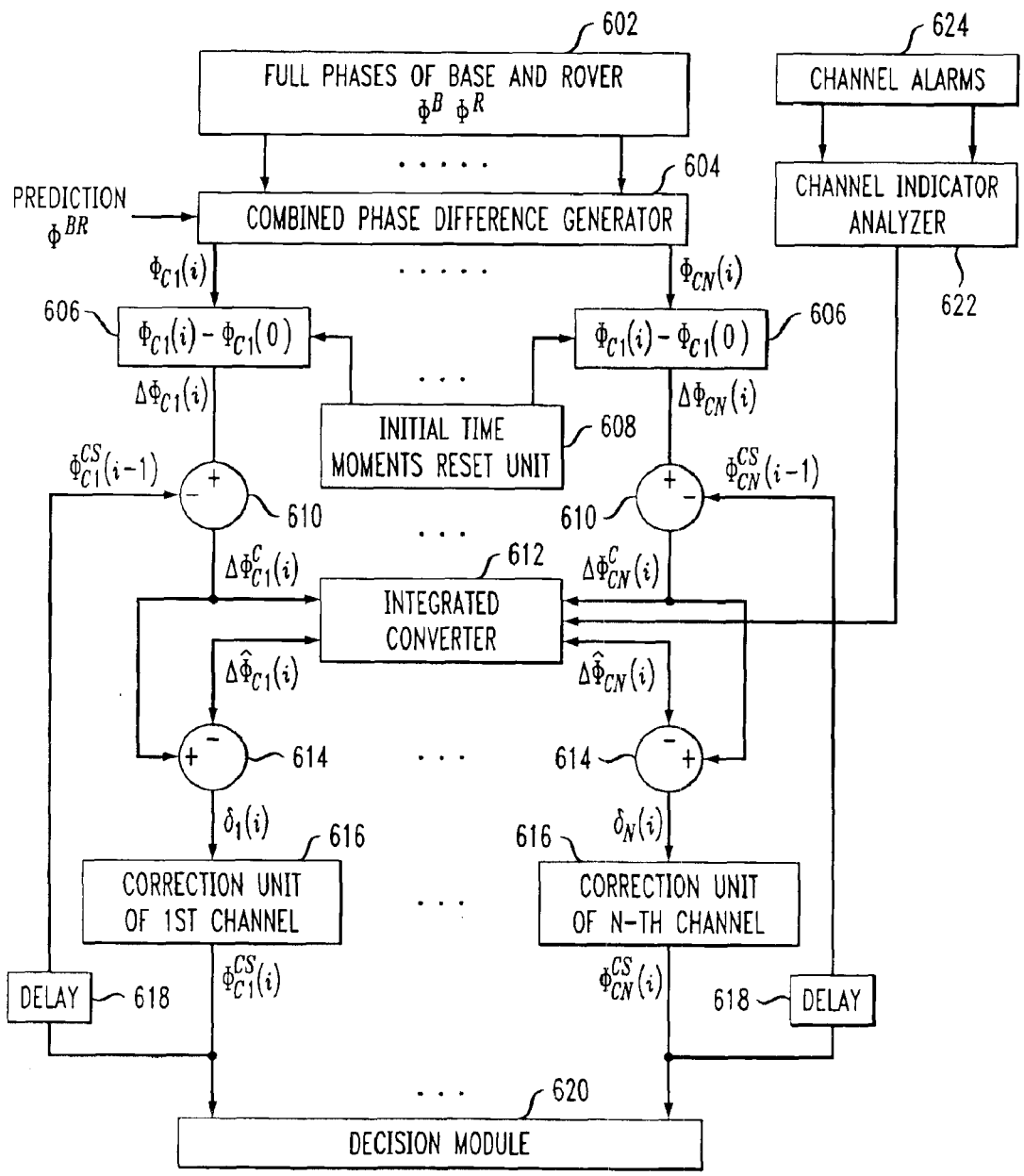
FIG. 6 shows a functional block diagram of a third embodiment of an anomaly indicator module in which initial ambiguities are deleted due to processing the increments of combined phase differences over the interval from initial to current measurements.

FIG. 6 shows a functional block diagram of a third embodiment of the anomaly indicator in which initial ambiguities are deleted due to processing the increments of combined phase differences over the interval from initial to current measurements. In addition, this embodiment of the indicator module is based upon the readings of the channel indicators. As represented in block 602 the inputs of the anomaly indicator module are single differences of full phases measured at the Base and Rover for each satellite. The combined phase difference generator 604 generates the vector Φc(i) of combined phase difference as described above in accordance with equation 13. Operator 606 generates the increment vector as follows:

$$\Delta\Phi c(i)=\Phi c(i)-\Phi c(0), \quad (18)$$

where Φc(0) is the value of the combined phase difference at the initial moment (i=0), the initial moment being reset periodically by the initial time moments reset unit 608, with a period equal to approximately 50 ... 100 seconds and also resetting upon the appearance of a new satellite signal.

Slip corrections $\Phi c^s(i-1)$ generated by the correction unit 616 (after a delay of one unit imposed by delay unit 618) are applied to the increments by operator 610 to generate corrected increments Φc(i) as follows:

$$\Delta\Phi c(i)=\Delta\Phi c(i)-\Phi c^{s}(i-1) \quad (19)$$

Next, the channel indicator alarms 624 are analyzed by the channel indicator analyzer 622 and the channels marked with alarms are deleted from further processing by the integrated converter 612. If the number of the channels remaining for processing is at least four, then the corrected increments ΔΦc(i) of the remaining channels are provided to the integrated converter 612 to generate $\Delta\hat{\Phi}(i)$ as follows:

$$\Delta\hat{\Phi}(i)=H(i)\cdot G(i)\cdot\Delta\Phi c^c(i) \quad (20)$$

Here, matrices H and G (as described above) are calculated only for the remaining channels. Next, the vector of residuals δ(i) for the corrected increments is generated by operator 614 as follows:

$$\delta(i)=\Delta\Phi c^c(i)-\Delta\hat{\Phi}(i) \quad (21)$$

The residuals are then provided to the correction unit 616 where cycle slip-corrections are generated as described above in accordance with equation (12). As described above, these corrections, after the imposition of a delay by delay unit 618, will be used for the calculation associated with the next measurement period. As seen, the correction loop in this embodiment of the anomaly indicator module is closed. In fact, the correction loop will work if alarms of the channel indicators appear.

The decision module 620 operates in manner similar to that described above in accordance with the decision module 322 of FIG. 3. For example, the results obtained in the anomaly indicator module, including cycle slip-corrections, may be provided to the navigation location determining module 206, in order to improve the results of the navigation task.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for detecting anomalous phase measurements in a satellite differential navigation system in which a first satellite receiver and a second satellite receiver each compute phase measurements on a plurality of satellite channels, said method comprising the steps, performed for each of a plurality of iterations, of:

a) generating a combined phase difference vector;

b) generating a phase mismatch vector representing the difference between said combined phase difference vector and an estimated combined phase difference vector;

c) generating an averaged estimate vector representing the averaged estimate of said phase mismatch vector over said channels;

d) generating a residual vector representing the difference between said phase mismatch vector and said averaged estimate vector;

e) generating a vector of controlling signals by linear transformation of said residual vector and said averaged estimate vector;

f) generating said estimated combined phase difference vector by successively storing components of said vector of controlling signals for each of said channels; and g) detecting anomalous phase measurements by analyzing said residual vector.

2. The method of claim 1 wherein said combined phase difference vector $\Phi c$ comprises phase differences ($\Phi c_1 \ldots \Phi c_j \ldots \Phi c_N$) for a j-th satellite channel, and wherein step a) of generating a combined phase difference vector further comprises the step of:

calculating said phase difference vector $\Phi c$ as $\Phi c = \Phi^B - \Phi^R$ where vector $\Phi^B$ comprises the full phases measured by one of said satellite receivers for each j-th satellite channel ($\Phi_{B1} \ldots \Phi_{Bj} \ldots \Phi_{BN}$) and vector $\Phi^R$ comprises the full phases measured by the other satellite receiver for each j-th satellite channel ($\Phi_{R1} \ldots \Phi_{Rj} \ldots \Phi_{RN}$).

3. The method of claim 1 wherein said first and second satellite receivers are dual frequency (f1 and f2) receivers and wherein said combined phase difference vector $\Phi c$ comprises phase differences ($\Phi c_1 \ldots \Phi c_j \ldots \Phi c_N$) for a j-th satellite channel, and wherein step a) of generating a combined phase difference vector further comprises the step of:

calculating said phase differences $\Phi c_j$ of said phase difference vector $\Phi c$ as $$\Phi c_j = (\Phi^B_{2j} - \Phi^R_{2j}) - (\Phi^B_{1j} - \Phi^R_{1j})(f2/f1)$$

where $\Phi^B_{2j}$ and $\Phi^B_{1j}$ represent the full phase measured by one of the satellite receivers at each j-th satellite channel at frequencies f2 and f1 respectively, and where $\Phi^R_{2j}$ and $\Phi^R_{1j}$ represent the full phase measured by the other of the satellite receivers at each j-th satellite channel at frequencies f2 and f1 respectively.

4. The method of claim 1 wherein said step c) of generating an averaged estimate vector $\Delta\Psi$ further comprises the step of:

calculating said average estimate vector $\Delta\Psi$ as $$\Delta\Psi = \left(\sum_{j=1}^{N} w_j \cdot \Delta\Phi c_j\right) / \left(\sum_{j=1}^{N} w_j\right)$$

where $\Delta\Phi c_j$ represents the components of said phase mismatch vector for a j-th satellite channel, $w_j$ represents a weight coefficient for each j-th satellite channel, and N represents the number of satellite channels.

5. The method of claim 1 wherein step c) of generating an averaged estimate vector $\Delta\Psi$ further comprises the step of:

calculating said average estimate vector $\Delta\Psi$ as $\Delta\Psi = H \cdot G \cdot \Delta\Phi c$ where H is a matrix of directional cosines, $\Delta\Phi c$ represents said phase mismatch vector, and G is a matrix defined by $G = (H^T R^{-1} H)^{-1} H^T R^{-1}$ where R is a covariance matrix of phase mismatches.

6. The method of claim 1 wherein said step e) of generating a vector of controlling signals further comprises the step of:

generating said vector of controlling signals in combined loop filters of each of said plurality of channels.

7. The method of claim 6 where each of said combined loop filters generates a control signal ($U_{cj}$) for a j-th channel according to the following:

$$U_{1j}(i) = \sum_{k=0}^{i} \gamma \delta_j(k)$$

$$U_{2j}(i) = \beta \delta_j(i) + U_{1j}(i)$$

$$U_{3j}(i) = \sum_{k=0}^{i} U_{2j}(k)$$

$$U_{cj}(i) = \Delta\Psi_j(i) + \alpha \delta_j(i) + U_{3j}(i) + V_{prj}(i)$$

where $V_{prj}(i)$ is a predicted value computed on the basis of a priori data, and $\alpha$, $\beta$, $\gamma$ are coefficients of the loop filter.

8. The method of claim 7 wherein said coefficients are time dependent and form a Kalman-type filter.

9. The method of claim 7 wherein said coefficients are constants and define a third-order channel loop.

10. The method of claim 1 wherein said step g) of detecting anomalous phase measurements farther comprises the steps of:

h) comparing residuals of said residual vector with a threshold, and i) determining that a particular channel has an anomalous phase measurement if a residual associated with said particular channel exceeds said threshold.

11. The method of claim 10 wherein said step h) of comparing further comprises the step of comparing the absolute value of said residuals to said threshold, wherein said threshold is in the range of 0.2 to 0.25 cycles.

12. The method of claim 10 wherein said step g) of detecting anomalous phase measurements further comprises the steps of:

j) eliminating said particular channel from subsequent iterations of step a); and repeating steps b) through j) until no residual exceeds said threshold or until a threshold number of said channels remain.

13. The method of claim 1 wherein said step g) of detecting anomalous phase measurements further comprises the steps of:

h) generating a weighted sum of residual squares for said channels;

i) comparing said weighted sum of residual squares to a threshold; and j) determining that an anomalous phase measurement exists if said weighted sum of residual squares exceeds said threshold.

14. The method of claim 13 wherein said step g) of detecting anomalous phase measurements further comprises the step of:

k) determining that a particular channel has an anomalous phase measurement if a residual associated with said particular channel is the maximum residual in said residual vector.

15. The method of claim 14 wherein said step g) of detecting anomalous phase measurements further comprises the steps of:

l) eliminating said particular channel from subsequent iterations of step a); and repeating steps b) through l) until said weighted sum of residual squares does not exceed said threshold or until a threshold number of said channels remain.

16. The method of claim 13 wherein said step g) of detecting anomalous phase measurements further comprises the steps of:

k) eliminating x channels from subsequent iterations of step a), varying the channels eliminated for each iteration of step k); and repeating steps b) through k) until either said weighted sum of residual squares does not exceed said threshold or until x reaches a threshold, incrementing x by one after all combinations of channels for a given x have been eliminated during an iteration of step k).

17. The method of claim 1 wherein said steps are performed in one of said satellite receivers.

18. The method of claim 17 wherein said one satellite receiver receives phase measurements from the other satellite receiver.

19. The method of claim 1 further comprising the step of:

h) using information about said anomalous phase measurements detected in step g) in a navigation task.

20. The method of claim 19 further comprising the step of:

i) generating a cycle slip estimate for a channel determined to have an anomalous phase measurement and using said cycle slip estimate in said navigation task.

21. An apparatus for detecting anomalous phase measurements in a satellite differential navigation system in which a first satellite receiver and a second satellite receiver each compute phase measurements on a plurality of satellite channels, said apparatus comprising:

a combined phase difference generator for generating a combined phase difference vector;

means for generating a phase mismatch vector representing the difference between said combined phase difference vector and an estimated combined phase difference vector;

an integrated discriminator for generating an averaged estimate vector representing the averaged estimate of said phase mismatch vector over said channels;

means for generating a residual vector representing the difference between said phase mismatch vector and said averaged estimate vector;

at least one joint loop filter for generating a vector of controlling signals by linear transformation of said residual vector and said averaged estimate vector;

an accumulator for generating said estimated combined phase difference vector by successively storing components of said vector of controlling signals for each of said channels; and a residuals analyzer for detecting anomalous phase measurements by analyzing said residual vector.

22. The apparatus of claim 21 wherein said combined phase difference vector $\Phi c$ comprises phase differences $(\Phi c_1 \ldots \Phi c_j \ldots \Phi c_N)$ for a j-th satellite channel, and wherein said phase difference generator generates said combined phase difference vector $\Phi c$ as $\Phi c = \Phi^B - \Phi^R$ where vector $\Phi^B$ comprises the full phases measured by one of said satellite receivers for each j-th satellite channel $(\Phi_{B1} \ldots \Phi_{Bj} \ldots \Phi_{BN})$ and vector $\Phi^R$ comprises the full phases measured by the other satellite receiver for each j-th satellite channel $(\Phi_{R1} \ldots \Phi_{Rj} \ldots \Phi_{RN})$.

23. The apparatus of claim 21 wherein said first and second satellite receivers are dual frequency (f1 and f2) receivers and wherein said combined phase difference vector $\Phi c$ comprises phase differences $(\Phi c_1 \ldots \Phi c_j \ldots \Phi c_N)$ for a j-th satellite channel, and wherein said phase difference generator generates said phase differences $\Phi c_j$ of said phase difference vector $\Phi c$ as $$\Phi c_j = (\Phi^B_{2j} - \Phi^R_{2j}) - (\Phi^B_{1j} - \Phi^R_{1j})(f2/f2)$$

where $\Phi^B_{2j}$ and $\Phi^B_{1j}$ represent the full phase measured by one of the satellite receivers at each j-th satellite channel at frequencies f2 and f1 respectively, and where $\Phi^R_{2j}$ and $\Phi^R_{1j}$ represent the full phase measured by the other of the satellite receivers at each j-th satellite channel at frequencies f2 and f1 respectively.

24. The apparatus of claim 21 wherein said integrated discriminator generates said averaged estimate vector $\Delta\Psi$ as $$\Delta\Psi = \left(\sum_{j=1}^{N} w_j \cdot \Delta\Phi c_j\right) / \left(\sum_{j=1}^{N} w_j\right)$$

where $\Delta\Phi c_j$ represents the components of said phase mismatch vector for a j-th satellite channel, $w_j$ represents a weight coefficient for each j-th satellite channel, and N represents the number of satellite channels.

25. The apparatus of claim 21 wherein said integrated discriminator generates said averaged estimate vector $\Delta\Psi$ as $\Delta\Psi = H \cdot G \cdot \Delta\Phi c$ where H is a matrix of directional cosines, $\Delta\Phi c$ represents said phase mismatch vector, and G is a matrix defined by $G = (H^T R^{-1} H)^{-1} H^T R^{-1}$ where R is a covariance matrix of phase mismatches.

26. The apparatus of claim 21 wherein said joint loop filter generates said vector of controlling signals in combined loop filters of each of said plurality of channels.

27. The apparatus of claim 26 wherein each of said at least one combined loop filters generates a control signal ($U_{cj}$) for a j-th channel according to the following:

$$U_{1j}(i) = \sum_{k=0}^{i} \gamma \delta_j(k)$$

$$U_{2j}(i) = \beta \delta_j(i) + U_{1j}(i)$$

$$U_{3j}(i) = \sum_{k=0}^{i} U_{2j}(k)$$

$$U_{cj}(i) = \Delta\Psi_j(i) + \alpha \delta_j(i) + U_{3j}(i) + V_{prj}(i)$$

where $V_{prj}(i)$ is a predicted value computed on the basis of a priori data, and $\alpha$, $\beta$, $\gamma$ are coefficients of the loop filter.

28. The apparatus of claim 27 wherein said coefficients are time dependent and form a Kalman-type filter.

29. The apparatus of claim 27 wherein said coefficients are constants and define a third-order channel loop.

30. The apparatus of claim 21 wherein said residuals analyzer detects anomalous phase measurements by comparing residuals of said residual vector with a threshold and determining that a particular channel has an anomalous phase measurement if a residual associated with said particular channel exceeds said threshold.

31. The apparatus of claim 21 wherein said residuals analyzer detects anomalous phase measurements by generating a weighted sum of residual squares for said channels, comparing said weighted sum of residual squares to a threshold, and determining that an anomalous phase measurement exists if said weighted sum of residual squares exceeds said threshold.

32. The apparatus of claim 31 wherein said residuals analyzer further detects anomalous phase measurements by determining that a particular channel has an anomalous phase measurement if a residual associated with said particular channel is the maximum residual in said residual vector.

33. A method for detecting anomalous phase measurements in a satellite differential navigation system in which a first satellite receiver and a second satellite receiver each compute phase measurements on a plurality of satellite channels, said method comprising the steps, performed for each of a plurality of iterations, of:
   a) generating a combined phase difference vector;
   b) generating an increment vector representing the difference between said combined phase difference vector and a combined phase difference vector of a preceding iteration,
   c) generating an averaged increment estimate vector representing the averaged estimate of said increment vector;
   d) generating an incremental residual vector representing the difference between said increment vector and said averaged increment estimate vector;
   e) generating an integrated residual vector from said incremental residual vector; and
   f) detecting anomalous phase measurements by analyzing said integrated residual vector.

34. The method of claim 33 wherein step a) of generating a combined phase difference vector $\Phi c(i)$ further comprises the step of:
   calculating said phase difference vector $\Phi c(i)$ as $\Phi c(i) = \Phi^B(i) - \Phi^R(i) - \Phi^{BR}(i)$ where vector $\Phi^B(i)$ comprises the full phases measured by one of said satellite receivers for each i-th iteration and vector $\Phi^R(i)$ comprises the full phases measured by the other satellite receiver for each i-th iteration and $\Phi^{BR}(i)$ is a prediction of satellite movement.

35. The method of claim 33 wherein said step c) of generating an averaged increment estimate vector further comprises the step of:
   calculating said average estimate vector $\Delta\hat{\Phi}$ as $$\Delta\hat{\Phi}(i) = H(i) \cdot G(i) \cdot \Delta\Phi c(i),$$

where $\Delta\hat{\Phi}(i)$ represents the components of said average estimate vector for an i-th iteration, H is a matrix of directional cosines, G is a matrix defined by $G = (H^T R^{-1} H)^{-1} H^T R^{-1}$ where R is a covariance matrix of phase mismatches, and $\Delta\Phi c(i) = \Phi c(i) - \Phi c(i-1)$ where $\Phi c(i)$ is a vector of combined phase difference at each i-th iteration.

36. The method of claim 33 wherein said step e) of generating an integrated residual vector further comprises the step of generating integrated residuals $\delta(i)$ as $$\delta(i) = A \cdot \delta(i-1) + \Delta\delta(i)$$

for each i-th iteration, where A is a coefficient in the range 0.995 ... 0.999.

37. The method of claim 33 wherein said step f) of detecting anomalous phase measurements further comprises the steps of:
   g) generating a weighted sum of integrated residual squares for said channels;
   h) comparing said weighted sum of integrated residual squares to a threshold; and
   i) determining that an anomalous phase measurement exists if said weighted sum of integrated residual squares exceeds said threshold.

38. The method of claim 37 wherein said step f) of detecting anomalous phase measurements further comprises the steps of:
   j) eliminating x channels from subsequent iterations of step a), varying the channels eliminated for each iteration of step j); and
   repeating steps b) through j) until either said weighted sum of integrated residual squares does not exceed said threshold or until x reaches a threshold, incrementing x by one after all combinations of channels for a given x have been eliminated during an iteration of step j).

39. The method of claim 33 wherein said steps are performed in one of said satellite receivers.

40. The method of claim 39 wherein said one satellite receiver receives phase measurements from the other satellite receiver.

41. The method of claim 33 further comprising the step of:
   g) using information about said anomalous phase measurements detected in step f) in a navigation task.

42. The method of claim 41 further comprising the step of:
   h) generating a cycle slip estimate for a channel determined to have an anomalous phase measurement and using said cycle slip estimate in said navigation task.

43. The method of claim 33 further comprising the steps of:
   g) receiving channel indicator alarms from a channel indicator, said channel indicator alarms marking channels with anomalous phase measurements;
   h) eliminating channels marked with channel indicator alarms from subsequent iterations of step a); and
   i) repeating steps a) through f).

44. The method of claim 43 wherein said step f) of detecting anomalous phase measurements further comprises the steps of:
   j) generating a weighted sum of integrated residual squares for said channels;
   k) comparing said weighted sum of integrated residual squares to a threshold; and
   l) determining that an anomalous phase measurement exists if said weighted sum of integrated residual squares exceeds said threshold.

45. An apparatus for detecting anomalous phase measurements in a satellite differential navigation system in which a first satellite receiver and a second satellite receiver each compute phase measurements on a plurality of satellite channels, said apparatus comprising:
   a) a combined phase difference generator for generating a combined phase difference vector;
   b) means for generating an increment vector representing the difference between said combined phase difference vector and a combined phase difference vector of a preceding measurement,
   c) an integrated converter for generating an averaged increment estimate vector representing the averaged estimate of said increment vector;
   d) means for generating an incremental residual vector representing the difference between said increment vector and said averaged increment estimate vector,
   e) a digital filter for generating an integrated residual vector from said incremental residual vector; and
   f) a residuals analyzer for detecting anomalous phase measurements by analyzing said integrated residual vector.

46. The apparatus of claim 45 wherein said combined phase difference generator generates said combined phase difference vector Φc(i) as Φc(i)=Φ$^B$(i)−Φ$^R$(i)−Φ$^{BR}$(i) where vector Φ$^B$(i) comprises the full phases measured by one of said satellite receivers for each i-th iteration and vector Φ$^R$(i) comprises the full phases measured by the other satellite receiver for each i-th iteration and Φ$^{BR}$(i) is a prediction of satellite movement.

47. The apparatus of claim 45 wherein said integrated converter generates said averaged increment estimate vector $\Delta\hat{\Phi}$ as $$\Delta\hat{\Phi}(i)=H(i)\cdot G(i)\cdot\Delta\Phi c(i),$$

where $\Delta\hat{\Phi}(i)$ represents the components of said average estimate vector for an i-th iteration, H is a matrix of directional cosines, G is a matrix defined by G=(H$^T$R$^{-1}$H)$^{-1}$ H$^T$R$^{-1}$ where R is a covariance matrix of phase mismatches, and ΔΦc(i)=Φc(i)−Φc(i−1) where Φc(i) is a vector of combined phase difference at each i-th iteration.

48. The apparatus of claim 45 wherein said residuals analyzer detects anomalous phase measurements by generating a weighted sum of integrated residual squares for said channels, comparing said weighted sum of integrated residual squares to a threshold, and determining that an anomalous phase measurement exists if said weighted sum of integrated residual squares exceeds said threshold.

49. The apparatus of claim 45 wherein said digital filter generates integrated residuals δ(i) as $$\delta(i)=A\cdot\delta(i-1)+\Delta\delta(i)$$

for each of an i-th iteration, where A is a coefficient in the range 0.995 . . . 0.999.

50. A method for detecting anomalous phase measurements in a satellite differential navigation system in which a first satellite receiver and a second satellite receiver each compute phase measurements on a plurality of satellite channels, said method comprising the steps, performed for each of a plurality of iterations, of:
 a) generating a combined phase difference vector;
 b) generating an increment vector representing the difference between said combined phase difference vector and a combined phase difference vector of an initial measurement at an initial time,
 c) generating a corrected increment vector using a cycle slip correction estimate generated in a preceding iteration;
 d) analyzing channel indicator alarms;
 e) generating an averaged increment estimate vector representing the averaged estimate of said corrected increment vector using channels not associated with a channel indicator alarm;
 f) generating a residual vector representing the difference between the corrected increment vector and the averaged increment estimate vector; and
 g) generating said cycle slip correction estimate using said residual vector.

51. The method of claim 50 wherein said step a) of generating a combined phase difference vector further comprises the step of:
 including a prediction of phase difference in said difference.

52. The method of claim 50 wherein said initial time is reset periodically.

53. The method of claim 50 further comprising the step of:
 h) using said cycle slip correction estimate in a navigation task.

54. An apparatus for detecting anomalous phase measurements in a satellite differential navigation system in which a first satellite receiver and a second satellite receiver each compute phase measurements on a plurality of satellite channels, said apparatus comprising:
 a) a combined phase difference generator for generating a combined phase difference vector;
 b) means for generating an increment vector representing the difference between said combined phase difference vector and a combined phase difference vector of an initial measurement at an initial time;
 c) a cycle slip correction unit for generating a cycle slip correction estimate;
 d) means for generating a corrected increment vector using a cycle slip correction estimate generated in a preceding measurement;
 d) a channel indicator analyzer for analyzing channel indicator alarms;
 e) an integrated converter for generating an averaged increment estimate vector representing the averaged estimate of said corrected increment vector using channels not associated with a channel indicator alarm;
 f) means for generating a residual vector representing the difference between the corrected increment vector and the averaged increment estimate vector; and
 g) a correction unit for generating said cycle slip correction estimates using said residual vector.

55. The apparatus of claim 54 wherein said combined phase difference generator further generates said combined phase difference vector by including a prediction of phase difference in said difference.

56. The apparatus of claim 54 wherein said initial time is reset periodically.

* * * * *

UNITED STATES PATENT AND TRADEMARK OFFICE
CERTIFICATE OF CORRECTION

PATENT NO.   : 6,861,979 B1
DATED        : March 1, 2005
INVENTOR(S)  : Mark I. Zhodzishsky, Victor A. Veitsel and Andrey V. Narizhny It is certified that error appears in the above-identified patent and that said Letters Patent is hereby corrected as shown below:

Column 13,
Line 35, "$\pi_z$", should read -- $\Pi_\chi$ --.

Column 14,
Line 17, "$\pi_z$", should read -- $\Pi_\chi$ --.
Line 43, "$\Phi c^5(i)$", should read -- $\Phi c^s(i)$ --.

Column 17,
Line 43, "$\pi_z$", should read -- $\Pi_\chi$ --.

Column 18,
Line 11, "$\Phi c^5(i-1)$", should read -- $\Phi c^s(i-l)$ --.
Line 14, "$\Phi c(i)$", should read -- $\Delta\Phi c(i)$ --.
Equation 19, should read -- $\Delta\Phi c(i) = \Delta\Phi c(i) = -\Phi c^s(i-l)$ --.

Column 19,
Line 41, the equation should read -- $\Phi c_j = (\Phi^B_{2j} - \Phi^R_{2j}) - (\Phi^B_{1j} - \Phi^R_{1j})(f2/f1)$ --.

Column 22,
Line 6, the equation should read -- $\Phi c_j = (\Phi^B_{2j} - \Phi^R_{2j}) - (\Phi^B_{1j} - \Phi^R_{1j})(f2/f1)$ --.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,861,979 B1
DATED : March 1, 2005
INVENTOR(S) : Mark I. Zhodzishsky, Victor A. Veitsel and Andrey V. Narizhny It is certified that error appears in the above-identified patent and that said Letters Patent is hereby corrected as shown below:

Column 13,
Line 35, "$\pi_z$", should read -- $\Pi_\chi$ --.

Column 14,
Line 17, "$\pi_z$", should read -- $\Pi_\chi$ --.
Line 43, "$\Phi c^5(i)$", should read -- $\Phi c^s(i)$ --.

Column 17,
Line 43, "$\pi_z$", should read -- $\Pi_\chi$ --.

Column 18,
Line 11, "$\Phi c^5(i-1)$", should read -- $\Phi c^s(i-1)$ --.
Line 14, "$\Phi c(i)$", should read -- $\Delta\Phi c(i)$ --.
Equation 19, should read -- $\Delta\Phi c(i) = \Delta\Phi c(i) - \Phi c^s(i-1)$ --.

Column 19,
Line 41, the equation should read -- $\Phi c_j = (\Phi^B_{2j} - \Phi^R_{2j}) - (\Phi^B_{1j} - \Phi^R_{1j})(f2/f1)$ --.

Column 22,
Line 6, the equation should read -- $\Phi c_j = (\Phi^B_{2j} - \Phi^R_{2j}) - (\Phi^B_{1j} - \Phi^R_{1j})(f2/f1)$ --.

This certificate supersedes Certificate of Correction issued May 24, 2005.

Signed and Sealed this

Second Day of August, 2005

JON W. DUDAS
*Director of the United States Patent and Trademark Office*